United States Patent [19]
Suzuki

[11] Patent Number: 5,101,199
[45] Date of Patent: Mar. 31, 1992

[54] POLLING METHOD AND APPARATUS

[75] Inventor: Muneyuki Suzuki, Inagi, Japan

[73] Assignee: Kabushiki Kaisha Toshiba, Kawasaki, Japan

[21] Appl. No.: 713,616

[22] Filed: Jun. 12, 1991

Related U.S. Application Data

[63] Continuation of Ser. No. 515,329, Apr. 27, 1990, abandoned, which is a continuation of Ser. No. 250,452, Sep. 28, 1988, abandoned.

[30] Foreign Application Priority Data

Sep. 30, 1987 [JP] Japan ................. 62-246787

[51] Int. Cl.$^5$ ............................ H04B 17/00
[52] U.S. Cl. .................. 340/825.08; 340/825.12
[58] Field of Search ............. 364/200, 900; 370/85.8, 370/95.2; 340/825.07, 825.08, 825.12, 825.16, 825.1, 825.18, 825.02, 505, 518, 521, 539, 534, 825.5, 825.51; 379/10, 18, 32, 33, 42

[56] References Cited

U.S. PATENT DOCUMENTS

| | | | |
|---|---|---|---|
| 3,638,191 | 1/1972 | Mann | 340/518 |
| 3,701,109 | 10/1972 | Peters | 340/825.51 |
| 4,071,908 | 1/1978 | Brophy et al. | 340/825.02 |
| 4,109,246 | 8/1978 | Budrys et al. | 340/518 |
| 4,390,750 | 6/1983 | Bartelink | 379/42 |
| 4,528,422 | 7/1985 | Cupani | 379/42 |
| 4,549,168 | 10/1985 | Sieradzki | 340/518 |
| 4,586,040 | 4/1986 | Akiba et al. | 340/518 |
| 4,644,109 | 2/1987 | Takeda et al. | 379/32 |
| 4,667,193 | 5/1987 | Cotie et al. | 340/825.08 |

FOREIGN PATENT DOCUMENTS

| | | | |
|---|---|---|---|
| 60-30146 | 2/1986 | Japan | 370/96 |
| 61-94431 | 5/1986 | Japan | 370/96 |
| 2178878 | 2/1987 | United Kingdom | 340/518 |

Primary Examiner—Donald J. Yusko
Assistant Examiner—Dervis Magistre
Attorney, Agent, or Firm—Finnegan, Henderson, Farabow, Garrett, and Dunner

[57] ABSTRACT

When an interrupt request to a control unit occurs, the control unit polls a plurality of interrupt request terminal interfaces to locate which of the interrupt request terminal interfaces has generated the interrupt request. The control unit polls the plurality of interrupt request terminal interfaces in groups of several interrupt terminal interfaces to locate a group to which the interrupt request terminal interface has generated the interrupt request belongs, and polls only the respective interrupt requests terminal interfaces belonging to the located group to thereby locate the generated source of the interrupt request. Each interrupt request terminal interface generates an interrupt request as vector data indicative of contents directly corresponding to each interrupt condition.

10 Claims, 11 Drawing Sheets

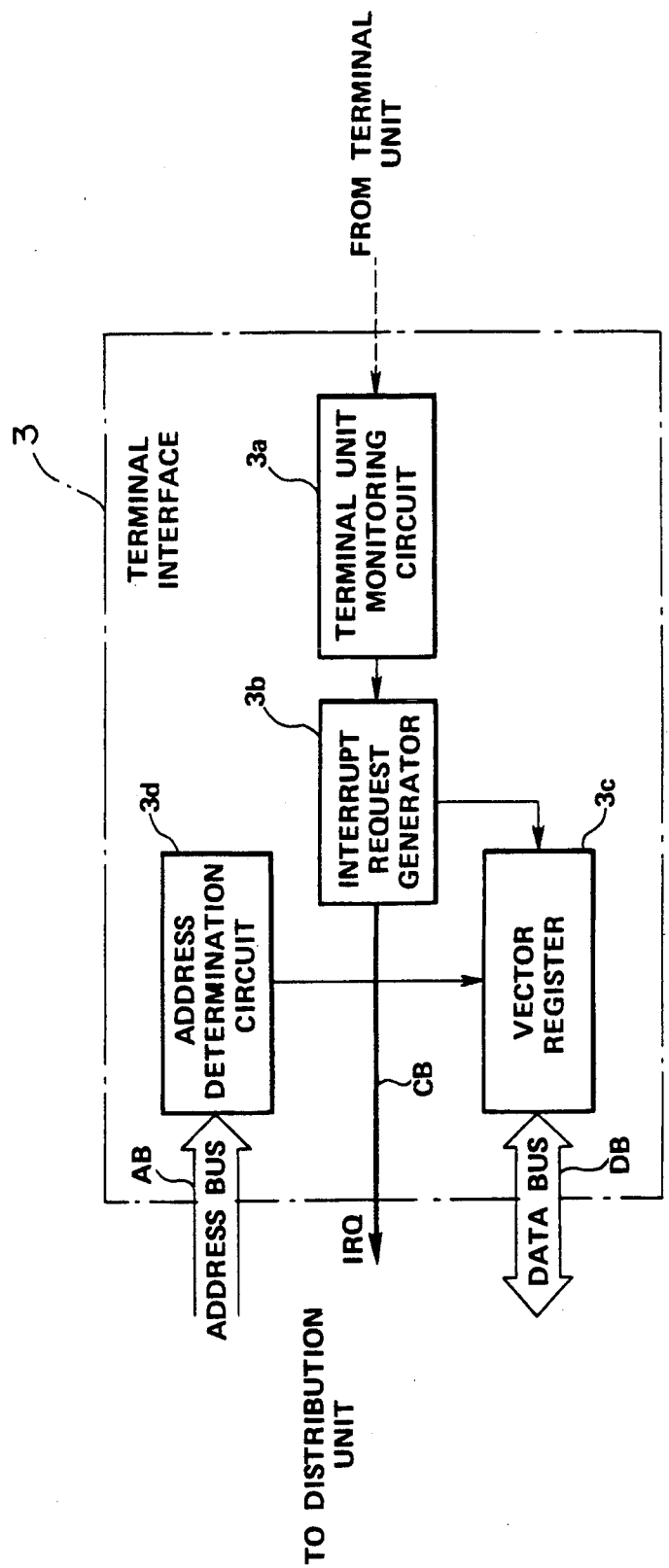

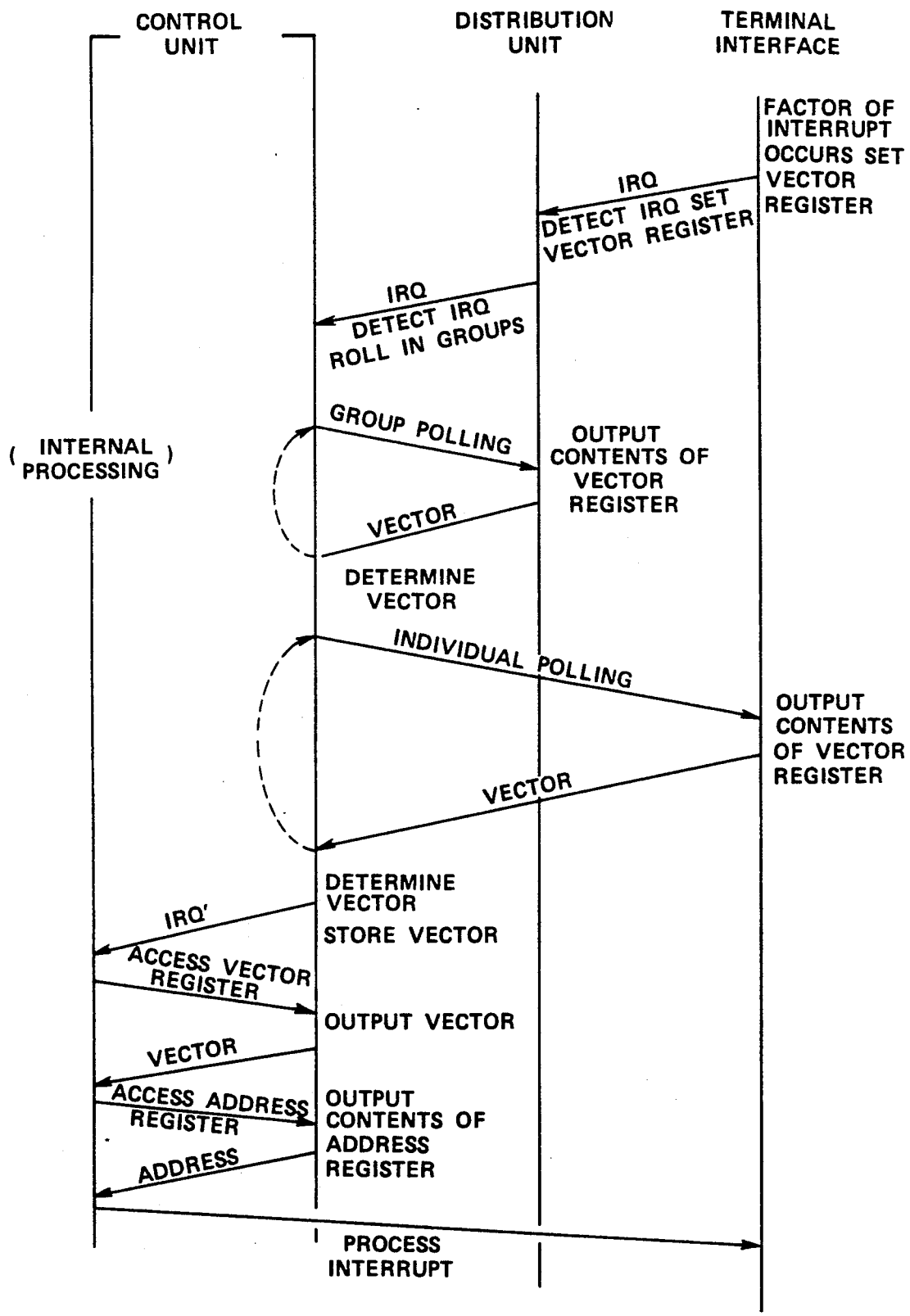

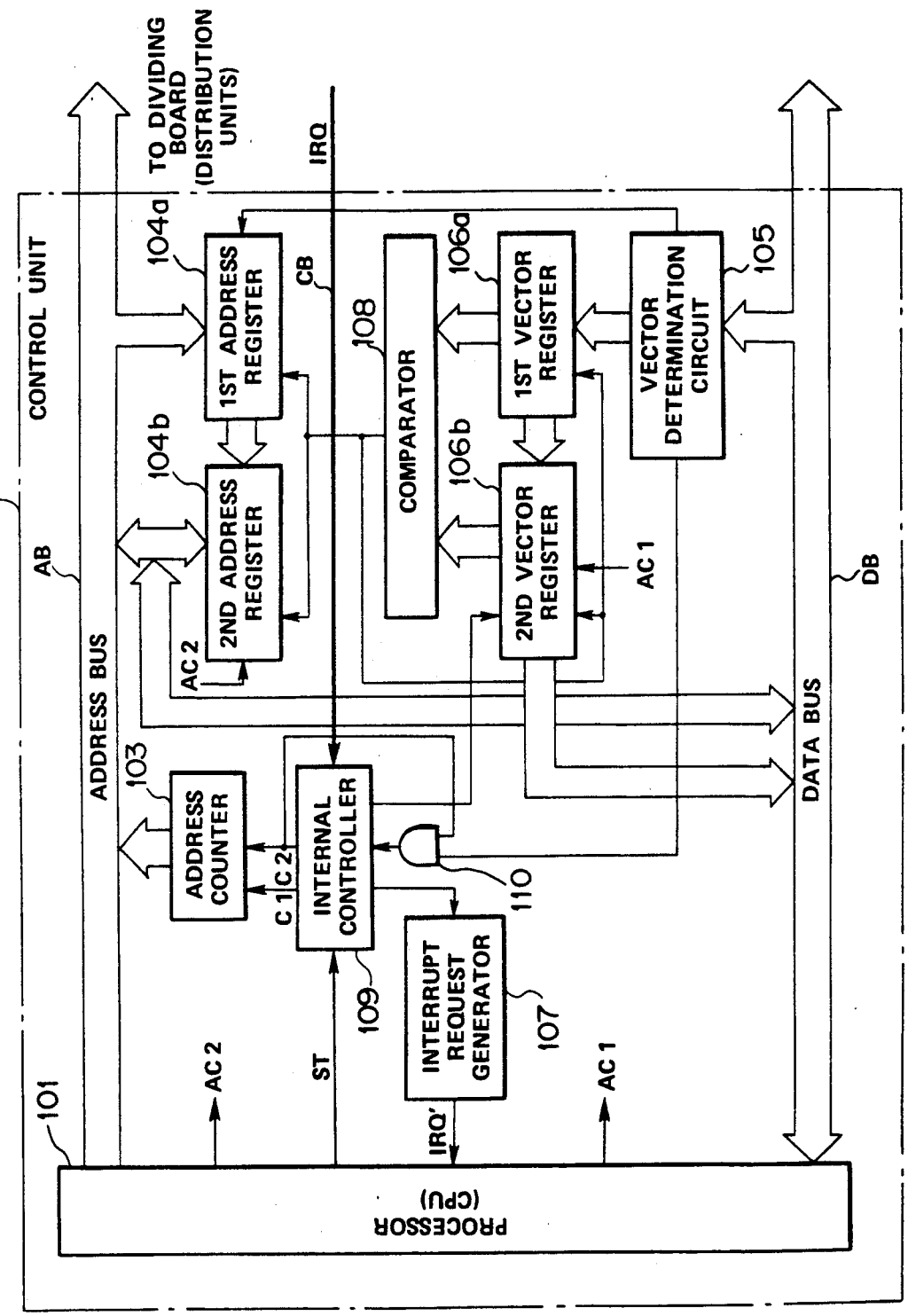

POLLING METHOD AND APPARATUS

This application is a continuation of application Ser. No. 7/515,329 filed Apr. 27, 1990, which is a continuation of application Ser. No. 07/250,452 filed Sept. 28, 1988, now abandoned.

BACKGROUND OF THE INVENTION

1. Field of the Invention

The present invention relates to polling methods and apparatus in which when an interrupt request to a control unit occurs at one of a plurality of interrupt request generating means, the control unit locates that interrupt request generating means by polling them and, more particularly, to such polling methods and apparatus in which the interrupt request generating means which has generated the interrupt request is located efficiently in a short time however many such interrupt request generating means there may be.

2. Description of the Prior Art

There is, for example, a high speed multimedium multiplexer which locates which of a plurality of interrupt request generating means has generated an interrupt request. The multiplexer packets the output data from various terminal units such as telephone sets and/or data terminal units and sends the data via high-speed digital lines in a time sharing manner to destination terminal units. FIG. 10 schematically illustrates the structure of the multiplexer which includes a control unit 1 which in turn includes a central processing unit (CPU), a plurality of bus relay units 2 (21-2M) which distribute and relay an address bus AB, a control bus CB, a multiplexing data bus hD and a data bus DB from a plurality of groups of N terminal interface units 3 (31, 32, ...; 3(K-1), 3K, ...; ...,3N) (N=M in the particular embodiment), and a line interface unit 4 which multiplexes the outputs from the terminal interface units 31 ... 3N collected through the multiplexing data bus and hD and sends the data to a high speed digital line HD.

The individual terminal interface units 3 are connected to corresponding terminals (not shown) such as telephone sets a data terminals and function as the interrupt request generating means. When the following interrupt conditions occur at these terminal units:

1) a rise in the operation,
2) the transmission of signalling data (telephone number data), and
3) a change in the state, the corresponding terminal interfaces detect these conditions and generate predetermined interrupt requests to the control unit 1.

When the control unit 1 receives such an interrupt request from any of the terminal interface units 3, it performs a polling operation on the terminal interface units sequentially, starting with the first one 31 to locate the terminal interface unit which has generated the interrupt request and executes a predetermined interrupt processing operation for collecting the data in accordance with the location of the interface unit.

The polling operation performed by the control unit 1 will now be described in more detail. Assume now that an interrupt condition occurs at a terminal unit corresponding to a $K^{th}$ terminal interface unit 3K, so that the terminal interface unit generates an interrupt request to the control unit 1 via the control bus CB. The individual terminal interface units 3 each include a vector register which indicates a reference number to the control unit 1 when the interrupt request is generated. The $K^{th}$ terminal interface unit 3K of interest also sets in the vector register thereof a vector number corresponding to its inherent address when it has generated the interrupt request.

The control unit 1 starts a polling operation in accordance with the generation of the interrupt request. In the polling, the control unit 1 first designates a first one 31 of the terminal interface units 3 and reads the contents of its vector register through the data bus DB. Unless the contents of the register contain a vector number, the control unit designates a second terminal interface unit 32 and repeats similar operations. In this way, the control unit 1 repeats the operation of designating the terminal interface units sequentially though the address bus AB and reading the contents of their vector registers through the data bus DB. Thus when the control unit designates a $K^{th}$ terminal interface 3K and reads the contents of its vector register, it detects that the vector number is contained in the register contents and locates that the terminal interface which has generated the interrupt request is the $K^{th}$ terminal interface unit 3K.

As just described above, in the multiplexer illustrated in FIG. 10, a terminal interface unit which generates an interrupt request to the control unit 1 in accordance with the occurrence of a corresponding interrupt condition sets in the vector register thereof a vector number corresponding to the address of that terminal interface unit. Therefore, there is a one-to-one correspondence between the physical address and vector number of each of the terminal interfaces. If the control unit 1 can only read a vector number by polling, it can located the terminal interface which has issued the interrupt request.

The control unit 1 has a look-up table in which there is a one-to-one correspondence between the physical position or address of each terminal interface unit and an interrupt condition to be generated, so that the control unit can know what the interrupt condition generated by a terminal interface is by locating the corresponding physical position of the terminal interface unit which has generated the interrupt request. In the multiplexer, the individual terminal interface units are allocated to corresponding interrupt conditions.

In the polling method performed by the multiplexer shown in FIG. 10, the plurality of terminal interfaces are polled sequentially to ascertain the presence of a generated interrupt request, so that a total of required polling times is not more than $$400 \text{ ns} \times 128 = 51.2 \ \mu s$$

if the cycle time required for one polling operation is 400 ns and the number of terminal interfaces is 128 (N=128) or so. However, if the whole scale of the multiplexer becomes large, so that, for example, 2,048 terminal interfaces (N=2048) are needed, a total of required polling times is very long and given by $$400 \text{ ns} \times 2,048 = 819.2 \ \mu s.$$

Therefore, according to the polling method, if the number of terminal interfaces is relatively small and if there are no limitations on the time required for the control unit 1 to process interrupt requests from the terminal interfaces even if the number of terminal interfaces is large, the control unit can effectively locate a generated source of interrupt request. However, if a great many terminal interfaces are needed in a multiplexer in which the time for processing a generated interrupt request is limited, it is impossible to continue to efficiently locate the source of the interrupt request constantly.

SUMMARY OF THE INVENTION

In view of the above situations, it is an object of the present invention to provide a polling method and apparatus which is capable of locating a generated source of interrupt request effectively in a short time, however many terminal interfaces which contain the generated source of interrupt request there may be.

In order to achieve such object, according to the present invention, a plurality of terminals which comprise interrupt request generating means are polled in groups of an appropriate number of terminal interfaces to locate a group which contains a generated source of interrupt request (the terminal interface which has generated the interrupt request). The terminal interfaces of the located group only are then polled in order to locate the generated source of interrupt request of interest.

Therefore, a total of required polling times is determined by ((the number of groups)+(the number of terminal interfaces per group))×(a cycle time required to one polling operation)

It will be obvious that however many terminal interfaces there may be, the total of required polling times is greatly reduced by dividing the terminal interfaces into an appropriate number of groups of terminal interfaces.

Each group may be further divided into subgroups and each subgroup may be further divided, in class, into lower-ranking subgroups. In this case, the located group means one in a range of groups ranging from the highest-ranking one to the the lowest-ranking one and containing the generated source of interrupt request. According to this method, the total of required polling times is further reduced.

According to the present invention, in addition to the above polling method, the degree of priority of a factor of interrupt is taken into consideration. When a plurality of terminal interfaces generate their interrupt requests, a group which contains a generated source of interrupt request corresponding to an interrupt condition having a higher degree of priority is located first.

Thus not only reduced is the total of required polling times, but also a further efficient use of the multiplexer is achieved.

Data (code) indicative of the contents of each interrupt condition irrespective of the physical address of a terminal interface is used as the vector set in the terminal interface in accordance with the generation of the interrupt request from the terminal interface. Conventionally, a one-to-one correspondence is given between the vector (vector number) and the physical address of a terminal interface, so that the physical address of the terminal interface is restricted to within a range determined by vectors (vector numbers), and hence the number of connections of terminal interfaces is naturally limited. However, by allocating vectors to different interrupt conditions; as mentioned above, the restrictions to the physical addresses allocated to terminal interfaces are eliminated.

BRIEF DESCRIPTION OF THE DRAWINGS

FIG. 4 is a block diagram illustrating the internal structure of a terminal interface shown in FIG. 1.

FIG. 5 is a sequence diagram showing the processing steps of an example of a polling method according to the present invention.

FIGS. 6A and 6B each are a block diagram of a control unit replacing the control unit shown in FIG. 1.

DESCRIPTION OF THE PREFERRED EMBODIMENT

Figure 1:
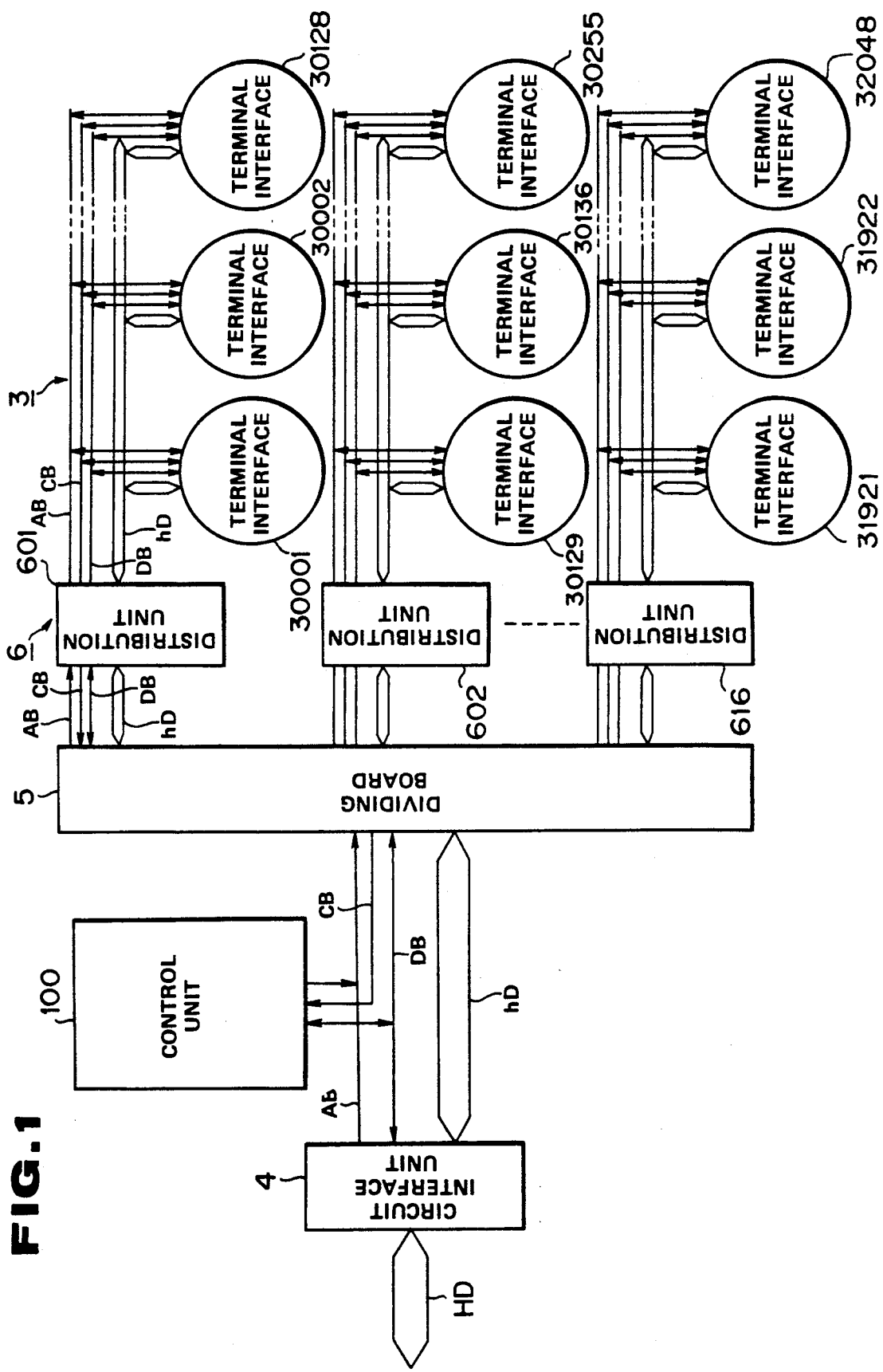
FIG. 1 is a block diagram of a high speed multimedium multiplexer to which a polling apparatus which carries outs one example of a polling method according to the present invention is applied.

FIG. 1 schematically illustrates a high speed multimedium multiplexer by which an example of a polling method according to the present invention is carried out.

Figure 10:
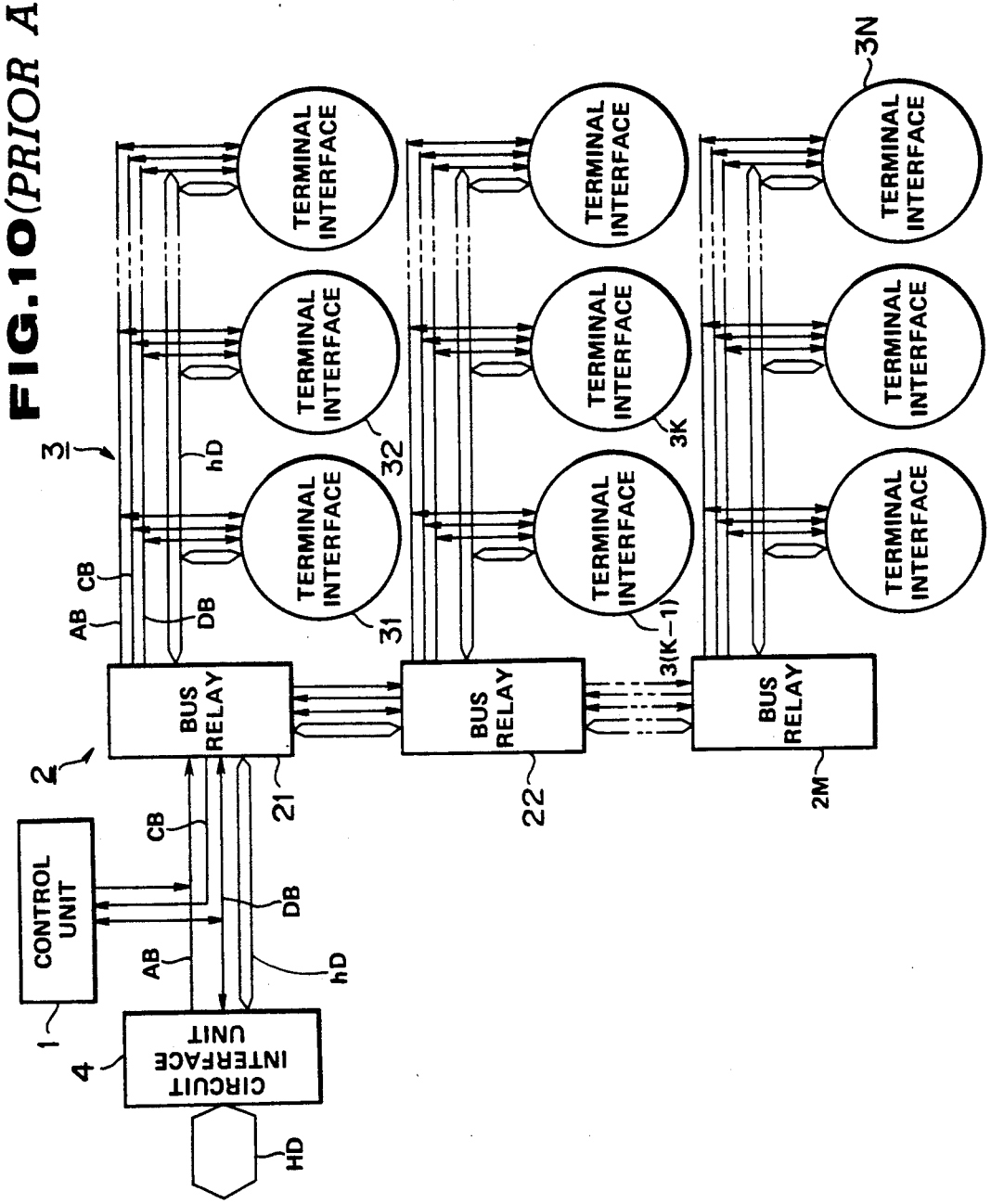
FIG. 10 is a block diagram of a conventional high speed multimedium multiplexer employed to carry out a conventional polling method.

In the multiplexer of FIG. 1, reference numeral 100 denotes a control unit which systematically controls the operation of the multiplexer and includes a processor (CPU); 5, a dividing board which divides each of an adress bus AB, a control bus CB, a data bus DB and a multiplexing data bus hD leading from the control unit 100 into 16 routes in the particular embodiment; 6) 601-616), distribution units allocated to bus lines leading from the dividing board 5 and distributing and relaying bus lines to the corresponding groups of terminal interfaces 3. The multiplexer in FIG. 1 is similar to that in FIG. 10 in that the terminal interfaces 3 are connected to various corresponding terminal units (not shown) such as telephone sets or data terminals and function as means for generating an interrupt request, and that the circuit line interface 4 communicates with the control unit 100 to multiplex the output data collected from the terminal interfaces 3 and transmits the multiplexed data to the high speed digital line HD.

First the structure of the multiplexer will be outlined. As shown in FIG. 1, in the particular embodiment, the multiplexer includes 2048 terminal interfaces 3 (30001-32048) which are divided into 16 groups of 128 interfaces which are connected in common to the 16 corresponding distribution units 6 (601-616) via corresponding bus lines (address bus AD, control bus CB and data bus DB). A first distribution unit 601 controls a first group of terminal interfaces 30001-30128, a second distribution unit 602 controls a second group of terminal interfaces 30129-30255, etc., and a 16th distribution unit 616 controls a 16th group of terminal interfaces 31921-32048.

As mentioned above, the terminal interfaces 3 (30001-32048) set vectors in their vector registers in accordance with interrupt conditions such as 1) a rise in the operation,
2) the transmission of signalling data (telephone number data), and
3) a change in the status.

Especially, in the particular embodiment, data (code) are used for directly identifying and indicating interrupt conditions (kinds of vector) such as 1)-3) as vectors set in the vector registers. Vector data set in the terminal interface 3 is irrespective of the physical address of that interface 3.

The physical addresses of these terminal interfaces 3 (30001-32048) are determined as shown in the Table below in consideration of the distribution units 6 (601-616).

result of the detection is applied to an interrupt request generator 3b.

The interrupt request generator 3b outputs an interrupt request IRQ to the control has CB and beforehand holds vector data indicative of an interrupt condition inherent to and generated at a terminal unit allocated to the terminal interface. The interrupt request generator 3b outputs the interrupt request IRQ in accordance with the detection of a generated interrupt condition by the terminal unit monitoring circuit 3a and sets the held vector data at a vector register 3c. The output interrupt request IRQ is delivered via the control bus CB to the corresponding distribution unit for the appropriate terminal interface group, and the vector data set in the vector register 3c is delivered to the corresponding distribution unit via the data bus DB.

Each distribution unit 6 has the structure shown in

| 4 UPPER BITS (DISTRIBUTION UNIT ADDRESSES) | | | | 8 LOWER BITS (ADDRESSES OF TERMINAL INTERFACES OF EACH GROUP) | | | | | | | | INSTRUCTED CONTENTS (POSITIONS) |
|---|---|---|---|---|---|---|---|---|---|---|---|---|
| 0 | 0 | 0 | 0 | 0 | 0 | 0 | 0 | 0 | 0 | 0 | 0 | DISTRIBUTION UNIT 601 |
| 0 | 0 | 0 | 0 | 0 | 0 | 0 | 0 | 0 | 0 | 0 | 1 | INTERFACE 30001 |
| 0 | 0 | 0 | 0 | 0 | 0 | 0 | 0 | 0 | 0 | 1 | 0 | INTERFACE 30002 |
| 0 | 0 | 0 | 0 | 1 | 0 | 0 | 0 | 0 | 0 | 0 | 0 | INTERFACE 30128 |
| 0 | 0 | 0 | 1 | 0 | 0 | 0 | 0 | 0 | 0 | 0 | 0 | DISTRIBUTION UNIT 602 |
| 0 | 0 | 0 | 1 | 0 | 0 | 0 | 0 | 0 | 0 | 0 | 1 | INTERFACE 30129 |
| 0 | 0 | 0 | 1 | 0 | 0 | 0 | 0 | 0 | 0 | 1 | 0 | INTERFACE 30130 |
| 0 | 0 | 0 | 1 | 1 | 0 | 0 | 0 | 0 | 0 | 0 | 0 | INTERFACE 30255 |
| 1 | 1 | 1 | 1 | 0 | 0 | 0 | 0 | 0 | 0 | 0 | 0 | DISTRIBUTION UNIT 616 |
| 1 | 1 | 1 | 1 | 0 | 0 | 0 | 0 | 0 | 0 | 0 | 1 | INTERFACE 31921 |
| 1 | 1 | 1 | 1 | 0 | 0 | 0 | 0 | 0 | 0 | 1 | 0 | INTERFACE 31922 |
| 1 | 1 | 1 | 1 | 1 | 0 | 0 | 0 | 0 | 0 | 0 | 0 | INTERFACE 32048 |

As shown in the Table, in the particular embodiment, the resprective physical addresses of the distribution units 6 (601-616) and 16 corresponding groups of terminal interfaces 3 (3001-32048) are each represented by address data of a total of twelve bits of four upper bits related to the distribution units 6 and eight lower bits related to the terminal interfaces 3. These address data are transmitted from the control unit 100 via the address bus AB to each distribution unit 6 or each terminal interface 3. For example, the address data "(0001) (00000000)" designates the second distribution unit 602. The address data "(0001) (00000010)" designates the terminal interface 30130 belonging to the second terminal interface group.

Figure 2:
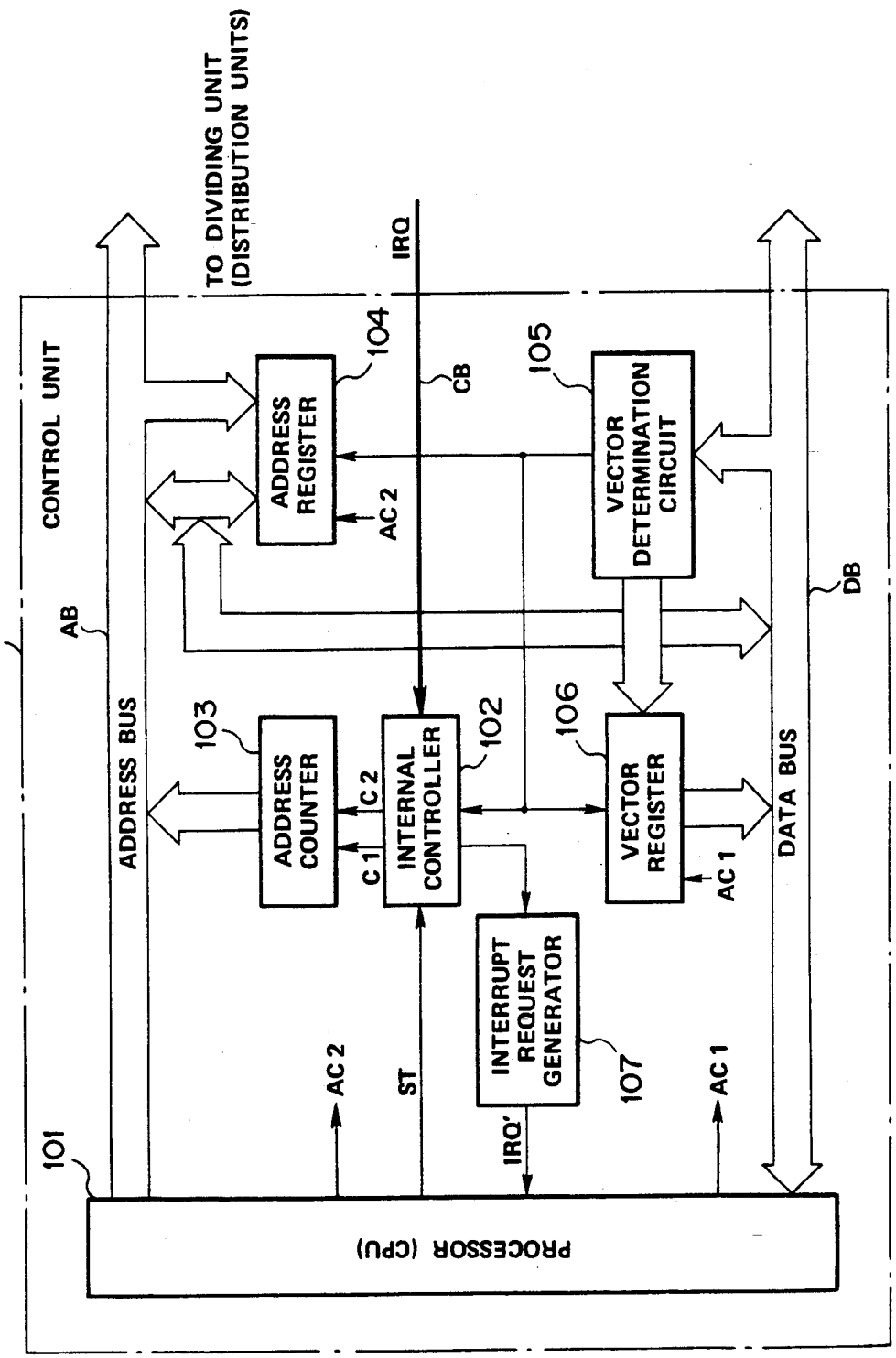
FIG. 2 is a block diagram illustrating the internal structure of a control unit shown in FIG. 1.
Figure 3:
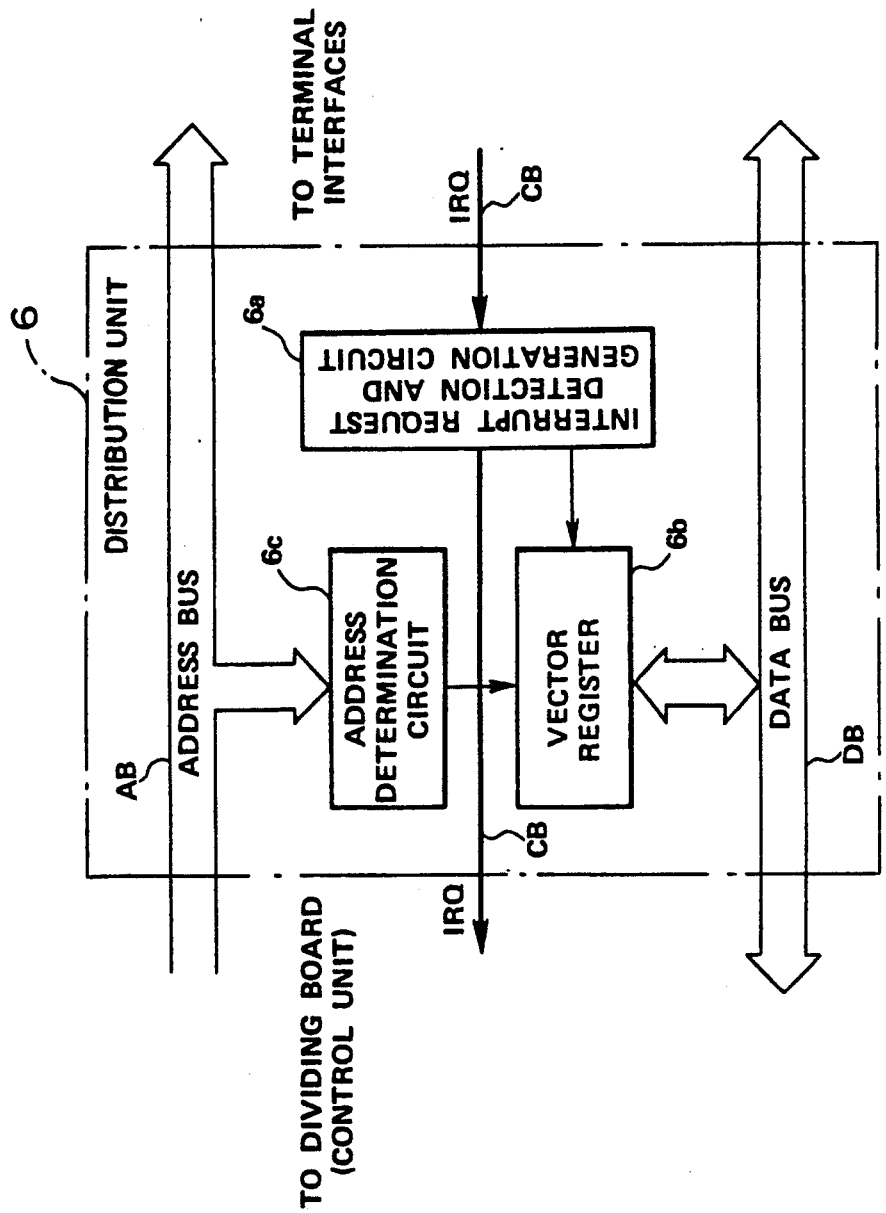
FIG. 3 is a block diagram illustrating the internal structure of a distribution unit shown in FIG. 1.

FIGS. 2, 3 and 4 show the specific structure of the control unit 100, the distribution units 6 and the terminal interfaces 3 of the polling apparatus which carries out the inventive polling method and are incorporated into the corresponding blocks of the multiplexer shown in FIG. 1

The operation of the multiplexer involving the polling operation will be described with respect to FIG. 1 in conjunction with FIGS. 2-4.

Assume that one of the interrupt conditions mentioned above has occurred at a terminal unit and that the terminal interface for the terminal unit detects this condition and has generated an interrupt request to the control unit 100.

Since each of the terminal interfaces 3 has a structure shown in FIG. 4, the terminal interface for the terminal unit which has generated an interrupt condition detects this fact via a terminal unit monitoring circuit 3a. The FIG. 3. The distribution unit which receives the output interrupt request IRQ detects the generation of the interrupt request IRQ in the terminal interface group which that distribution unit controls, through the interrupt request detection and generation circuit 6a.

When the interrupt request detection and generation circuit 6a receives the interrupt request IRQ via the control bus CB, it detects that fact and causes a vector register 6b to fetch the vector data transmitted to the corresponding data bus DB and to store them. It also functions to output a new interrupt request IRQ to the control bus CB on the side of the dividing board 5 (or the control unit 100). The interrupt request IRQ is then transmitted to the control unit 100 via the dividing board 5.

The control unit 100 has the structure shown in FIG. 2. The interrupt request IRQ output from the distribution unit (more specifically, from the interrupt request detection and generation circuit 6a) is applied to an internal controller 102.

The internal controller 102 mainly controls the polling operating of the control unit 100. It functions to apply a first counting command C1 to an address counter 103 to start the counter on condition that the controller 102 receives a polling permission status signal ST from a processor (CPU) 101 and the interrupt request IRQ through the control bus CB.

In the particular embodiment, the address counter 103 is a 12-bit counter corresponding to the address data shown in the aforementioned Table. When it receives the first counting command C1 from the internal controller 102, it performs a binary counting operation on the 4 upper bits of the address data at predetermined (polling) periods. Thus the distribution units 6 are sequentially designated, starting with the first one 601, via the address bus AB.

Each distribution unit 6 determines whether the address data transmitted to the corresponding address bus AB designates that distribution unit via the address determination circuit 6c thereof (see FIG. 3).

The address determination circuit 6c compares data indicative of the physical address allocated to and beforehand set therein with the address data transmitted via the address bus AB to detemime whether that distribution unit is designated. When the address determination circuit 6c determines that its distribution unit is designated, it issues a reading command to the vector register 6b(FIG. 3) to cause the vector reqister 6b to output its contents to the data bus DB. Thus, in accordance with the sequential designation of the distribution units from the control unit 100, the contents of the registers of these distribution units are fetched sequentially via the corresponding data bus DB by the control unit 100.

The control unit 100 monitors the fetched register contents of the respective distribution units (more specifically, of the corresponding vector registers 6b) using the vector determination circuit 105 (FIG. 5).

The vector determination circuit 105 determines whether the contents of the respective registers 6b transmitted sequentially to the data bus are vector data indicative of some inerrupt condition, as mentioned above. When the vector determination circuit 105, especially in the particular embodiment, determines that the transmitted register contents indicate one of the vector data segments, it transmits this fact to the internal controller 102, causes the address register 104 to fetch the address data indicative of the physical address of the distribution unit which has output the vector register, and causes the vector data 106 to store the determined vector data therein.

By the above mentioned processing operation of the control unit 100, the terminal interface group to which the terminal interface which has output the interrupt request IRQ belongs is located even if that terminal interface cannot be specified. It is to be noted that the first vector data is not required to be stored.

The internal contorller 102 which has received from the vector determination circuit 105 the information that the vector data has been determined generates a second counting command C2 to the address counter 103 to cause the address counter 103 to start counting.

Thus the address counter 103 executes a binary counting operation on the 8 lower bits of the 12 bit address data at predetermined periods in the same manner as that mentioned earlier. In the counting operation, the 4 upper bits are the address data on the located terminal interface group (distribution unit) fetched into the address register 104 and used in a fixed manner.

According to the addressing operation by the address register 104 and address counter 103, the terminal interfaces belonging to the located terminal interface group are sequentially designated, starting with an interface having a lower physical address number.

The individual terminal interfaces determine whether the address data transmitted via their address bus AB designate themselves using their address determination circuits 3d (FIG. 4).

As does the address determination circuit 6c of the distribuition unit 6, the address determination circuit 3d compares the data indicative of the physical address allocated to the corresponding terminal interface and beforehand set therein with the address data transmitted to the address bus AB to determine whether that terminal interface is designated. If so, the address determination circuit 3d issues a reading command to the vector register 3c (FIG. 4) to cause the vector register 3C to output its register contents to the data bus DB. Thus, the register contents of the terminal interfaces are sequentially fetched into the control unit 100 via the data bus DB in accordance with the sequential designations of the terminal interfaces from the control unit 100.

The control unit 100 monitors the fetched register contents from the respective interfaces (more specifically, from their respective vector registers 3c) through the vector determination circuit 105 thereof (FIG. 2). In the same manner as mentioned above, when the vector determination circuit 105 determines that the transmitted register contents indicate one of the vector data segments, it transmits this fact to the internal controller 102, causes the address register 104 to fetch the address data at that time, indicative of the physical address of the terminal interface which has output the vector data, and causes the vector register 106 to store the determined vector data therein.

When the internal controller 102 receives from the vector determination circuit 105 the data indicative of the fact that the second vector data is determined, it starts its interrupt request generator 107 to cause the interrupt request generator 107 to generate an interrupt request IRQ' and reports to CPU 101 the fact that the generated source of request (the terminal interface which has output the interrupt request IRQ) has been located.

When CPU 101 receives that report, it accesses the vector register 106 using a signal AC1 to read the vector data, accesses the address register 104 using a signal AC2 to read the address data from the register and performs a predetermined interrupting operation on the located terminal interface.

FIG. 5 illustrates, for reference, the polling operation of the multiplexer shown in FIGS. 1-4, as mentioned above.

As described above, according to the polling method, the terminal interfaces are polled in groups of an appropriate number of terminal interfaces (128 terminal interfaces in the particular embodiment, and more speifically, the distribution units comprising group control means are polled) to lcoate a group in which the generated source of interrupt (The terminal interface which has generated the interrupt request) is contained, and the terminal interfaces contained in the located group are the polled to thereby locate the generated source of the interrupt request of interest. Therefore, a total of required polling times is given at most by ((the number of groups)+(the number of terminal interfaces per group))×(a cycle time required for one polling operation)

If the cycle time required for one polling operation is 400 ns, the total of required polling times in the particular embodiment is given by $$(16+128) \times 400 \text{ ns} = 57.6 \ \mu\text{s}.$$

It will be obvious from the comparison with the conventional polling method that great time shortening is achieved by the particular embodiment.

How the plurality of terminal interfaces are grouped is optional. For example, if the number of groups is increased to 32 (the number of terminal interfaces per group in that case is 64), or if each of the groups is further divided into subgroups, the total of required polling times is further reduced.

When the next polling operation on the distribution units on the basis of the designation of the upper four bits of the address data is to be started is also optional. For example, the next polling operation may be started with the distribution unit having the physical address next to the address represented by the 4 upper bits of the address data set in the address register 104, namely, with the distribution unit having the physical address next to that of the located distribution unit. Alternatively, the polling operation may be always started with the first distribution unit 601 by resetting the address register 104.

While in the first embodiment all the interrupt conditions are handled equally and a terminal interface which has first generated an interrupt request IRQ is located, the following second embodiment is intended to consider the priority of interrupt conditions in the use of the system. When terminal interfaces generate their interrupt requests IRQ simultaneously or in a cycle time during which the terminal interfaces of a group are polled sequentially, the vector data is compared to first locate the group in which the generated source of interrupt request corresponding to an interrupt condition having a higher priorty is contained, and then the generated source of interrupt request corresponding to the interrupt condition having the higher degree of priority is located.

FIG. 6A shows the specific structure of a control unit 100 of a polling apparatus which performs the above mentioned function. The polling apparatus is the same in structure and operation as that incorporated now into the multiplexer of FIG. 1 except for the control unit. The elements of FIG. 6A which are the same as or correspond to those of FIG. 2 are given the same or corresponding characters and further duplicate description thereof will be omitted.

As shown in FIG. 6A, the control unit 100 includes first and second address registers 104a and 104b as the address register means and first and second vector registers 106a and 106b as the vector register means.

The first register shifts its stored data to the second register depending on the comparison output from a comparator 108 provided in the control unit 100. The comparator 108 compares the vector data segments stored in the first and second vector registers 106a and 106b, outputs a predetermined detection signal when the vector data of the first vector register 106a indicates an interrupt condition having a higher degree of priority than the vector data of the second vector register 106b, updates the contents of the second address register 104b with those of the first address register 104a, and updates the contents of the second vector register 106b with those of the first vectort register 106b.

As mentioned above, the vector data identifies and indicates the following interrupt conditions:
1) a rise in the operation,
2) the transmission of signalling data (telephone number data), and
3) a change in the status.

Assume herein that numerical data are allocated to interrupt conditions such that data of a larger numerical value represents an interrupt condition having a higher degree of priority in accordance with the degree of priority of use of the system. Thus, the comparison in priority between the contents of the first and second vector registers 106a and 106b performed by the comparator 108 is achieved solely by the comparison in numerical value between the register contents (vector data).

The internal controller 109 which controls the polling operation of control unit 100 is the same as the internal controller 102 of FIG. 2 in that the controller 109 issues a first counting command C1 to the address counter 103 to cause the counter to start to perform its binary counting operation on its 4 upper bits on condition that the controller 109 receives a polling permission status signal ST from CPU 101 and an interrupt request IRQ through the control bus CB, except that in the upper-four-bit addressing operation the controller 109 does not receive a report signal, if any, indicative of the determination on the vector data from the vector determination circuit 105, but continues to perform a round 4-bit addressing operation (the sequential addressing operation on all the 16 distribution units 601-616) through the address counter 103. After this round addressing operation has been completed, the controller issues a second counting command C2 to the address counter 103 to cause the counter to perform a binary counting operation on its 8 lower bits. In the 8-lower-bit counting operation, the address data fetched into the second address register 104b and indicative of the distribution unit which has output the vector data having the highest degree of priority in the round addressing operation is used fixedly as the four upper bits.

Thereafter, the internal controller 109 receives via an AND gate 110 a report signal indicative of the determination of the vector data output from the vector determination circuit 105 in the addressing operation on the 8 lower bits, starts to actuate the interrupt request generator 107 with the timing with which the report signal is received, and reports to CPU 101 that the generated source of the interrupt request has been located.

Each time the internal controller 109 issues each of the first and second counting commands C1 and C2 to the address counter 103, it clears the second vector register 106b so that in each of the addressing operations on the 4 upper bits and 8 lower bits, the data set initially in the first vector register 106a is unconditionally shifted to the second vector register as data indicative of a larger value. Such a shifting operation is also performed similarly between the first and second address registers 104a and 104b.

After CPU 101 receives the above report from the internal controller 109, it accesses the second vector register 106b using a signal AC1 to read the vector data therein, accesses the second address register 104b using a signal AC2 to read the address data and performs the predetermined interrupt processing operation on the located terminal interface as in the devices shown in FIGS. 2-4.

As described above, according to the control unit of FIG. 6A, a round polling operation is performed on the distribution units so that the terminal interface group is preferentially located which contains the terminal interface which has output the vector data having the highest degree of priority and which has generated the interrupt request IRQ on the basis of the address data on the distribution unit which has output the vector data having the highest degree of priority, and that only the terminal interfaces belonging to that terminal interface group are then polled to locate the terminal interface which has output the vector data having the highest degree of priority and generated the interrupt request IRQ. Therefore, as in the devices shown in FIGS. 2–4, the required polling time is greatly reduced in the most preferable manner in which the maximum efficiency of use of the system is maintained even if interrupt requests IRQ are output simultaneously or in a short time including, for example, a round polling time for the distribution units of one group from the plurality of terminal interface groups.

Figure 6B:
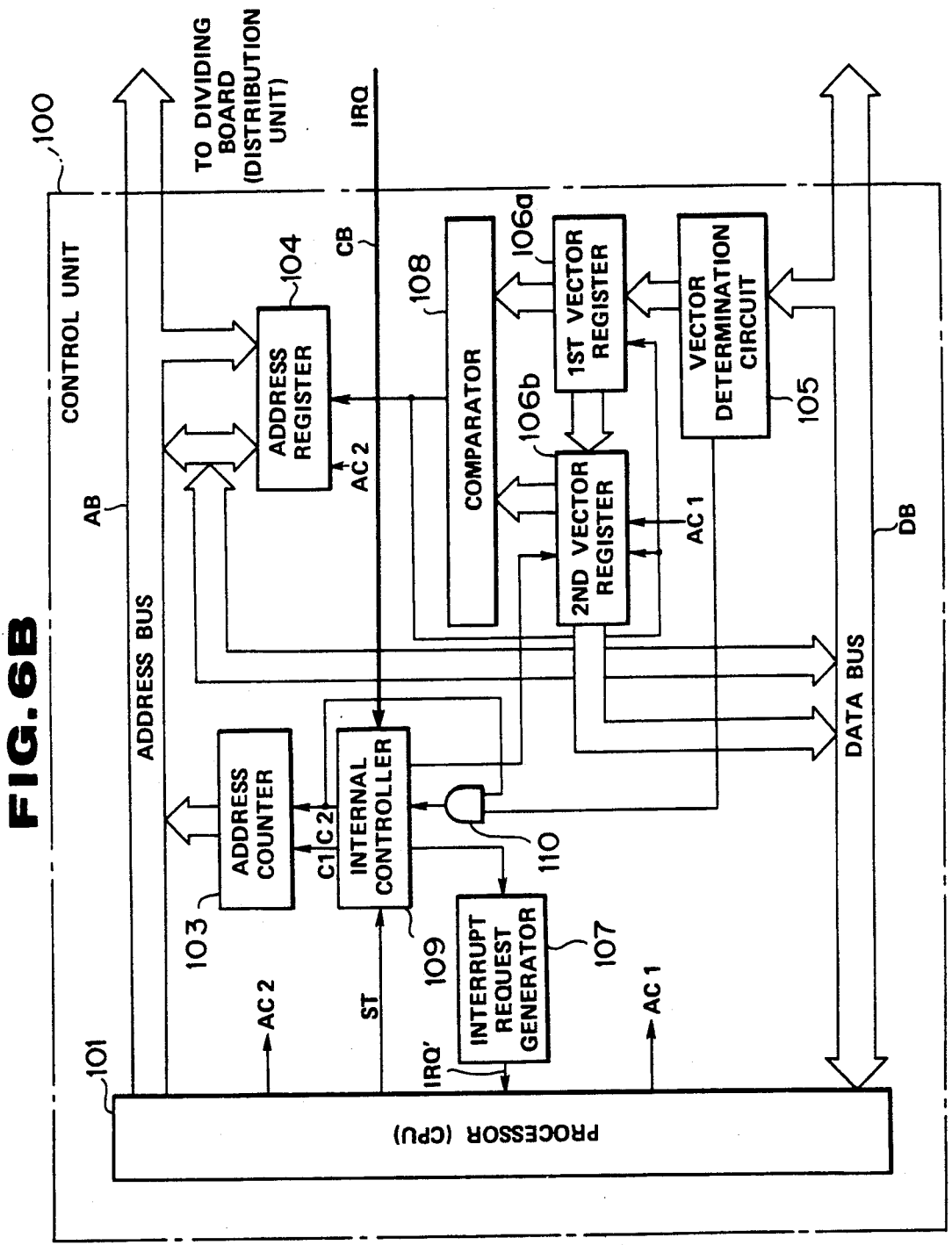

While the control unit of FIG. 6A uses the first and second address registers 104a and 104b as the address register means, as mentioned above, an equivalent control unit may be constituted using a single address register 104 arranged as the address register means so that the address register 104 takes in the address data on the address bus AB in accordance with the comparison output from the comparator 108, as shown in FIG. 6B.

In order to perform a polling operation in accordance with the degree of priority of a factor of interrupt as mentioned above, an efficient polling system may be used in which a plurality of control buses corresponding to the degrees of priority are provided such that interrupt requests are output selectively onto the control buses having the corresponding degrees of priority in accordance with the degrees of priority of interrupt conditions and, in the location of the generated source of interrupt request, the terminal interface which has output an interrupt request via a control bus having a higher degree of priority is preferentially located (more specifically, the group to which the terminal interface which has generated interrupt request belongs is first located).

Figure 7:
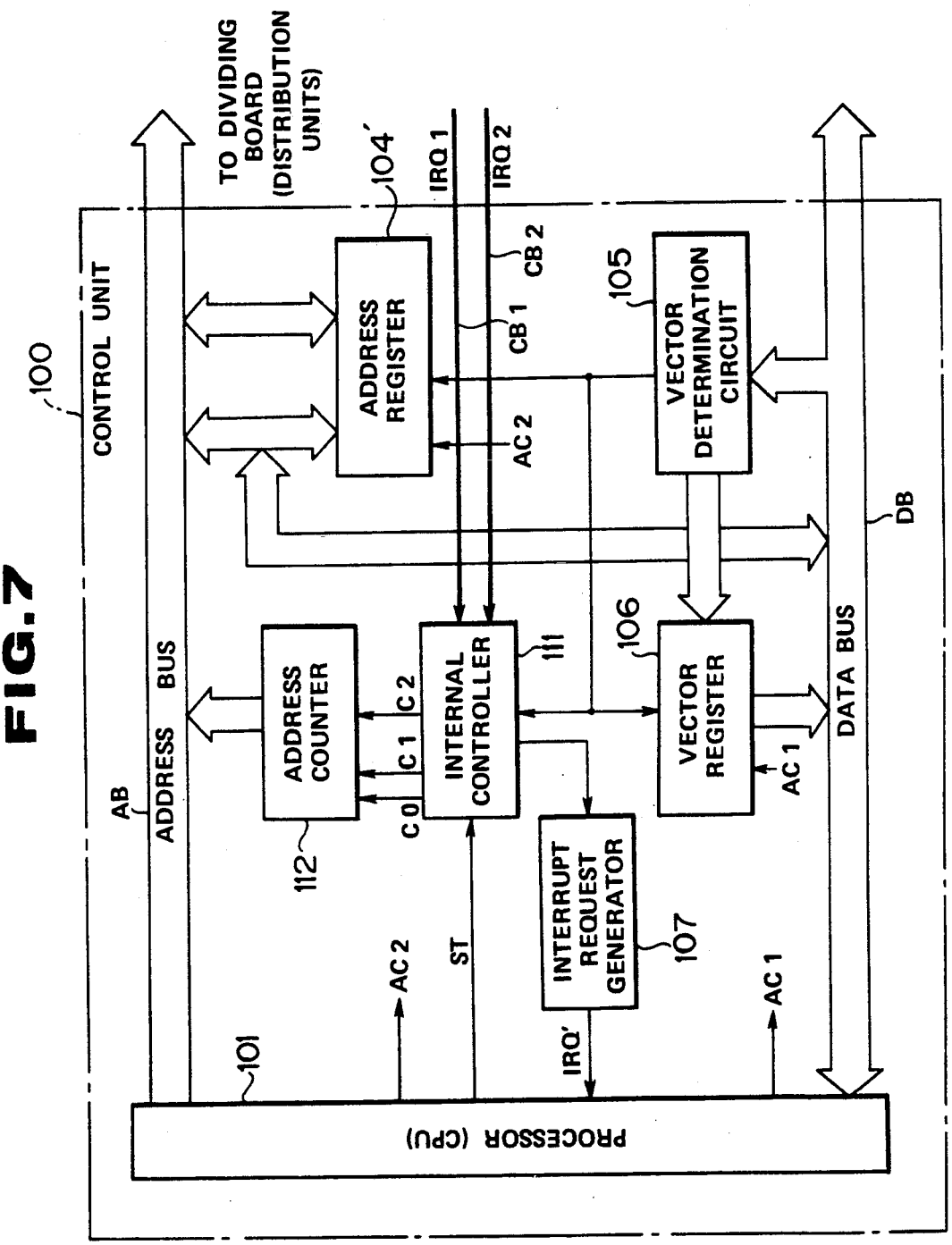
FIG. 7 is a block diagram of a control unit replacing the control unit shown in FIG. 1.
Figure 8:
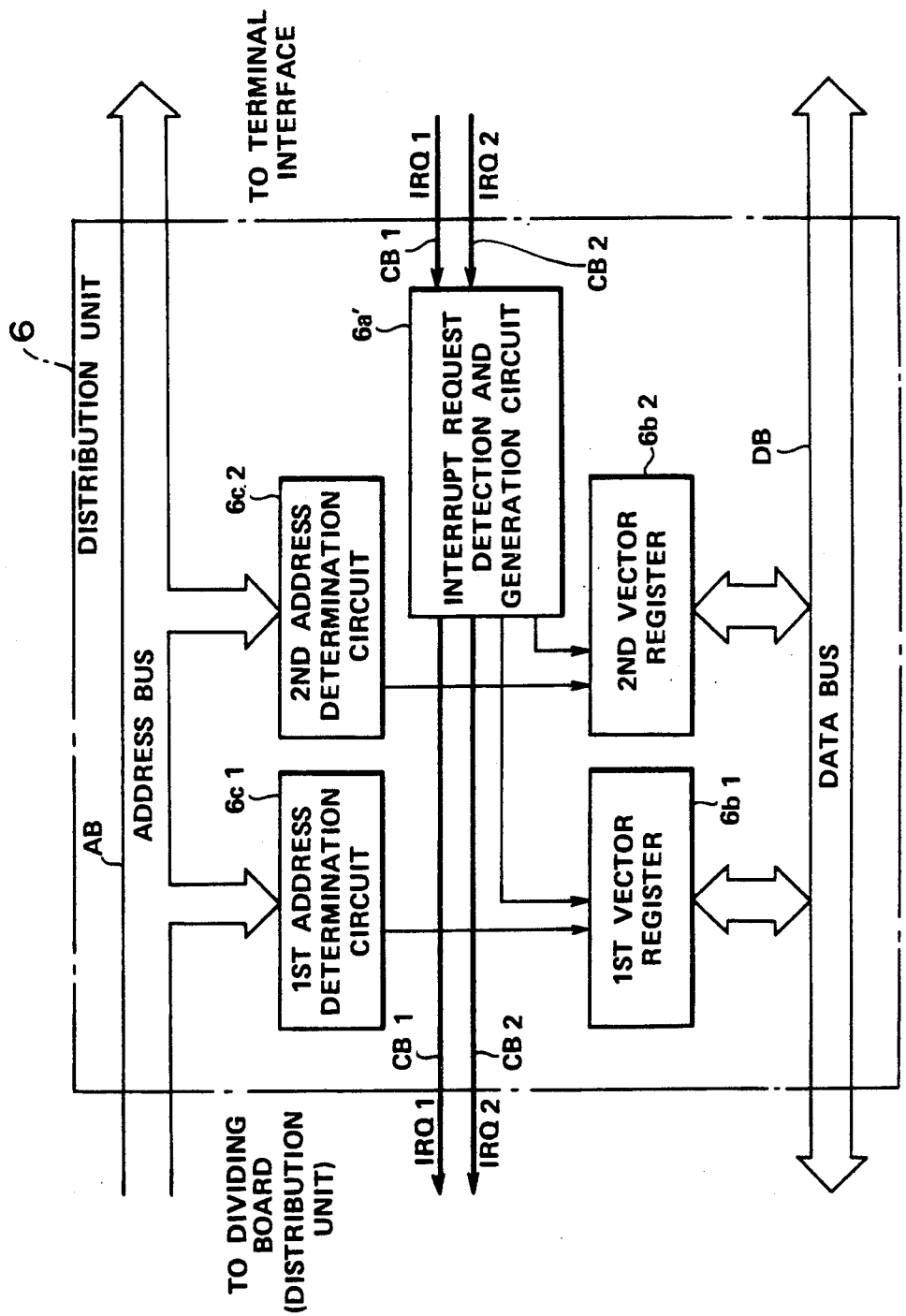
FIG. 8 is a block diagram of a distribution unit provided in conjunction with the control unit of FIG. 7.
Figure 9:
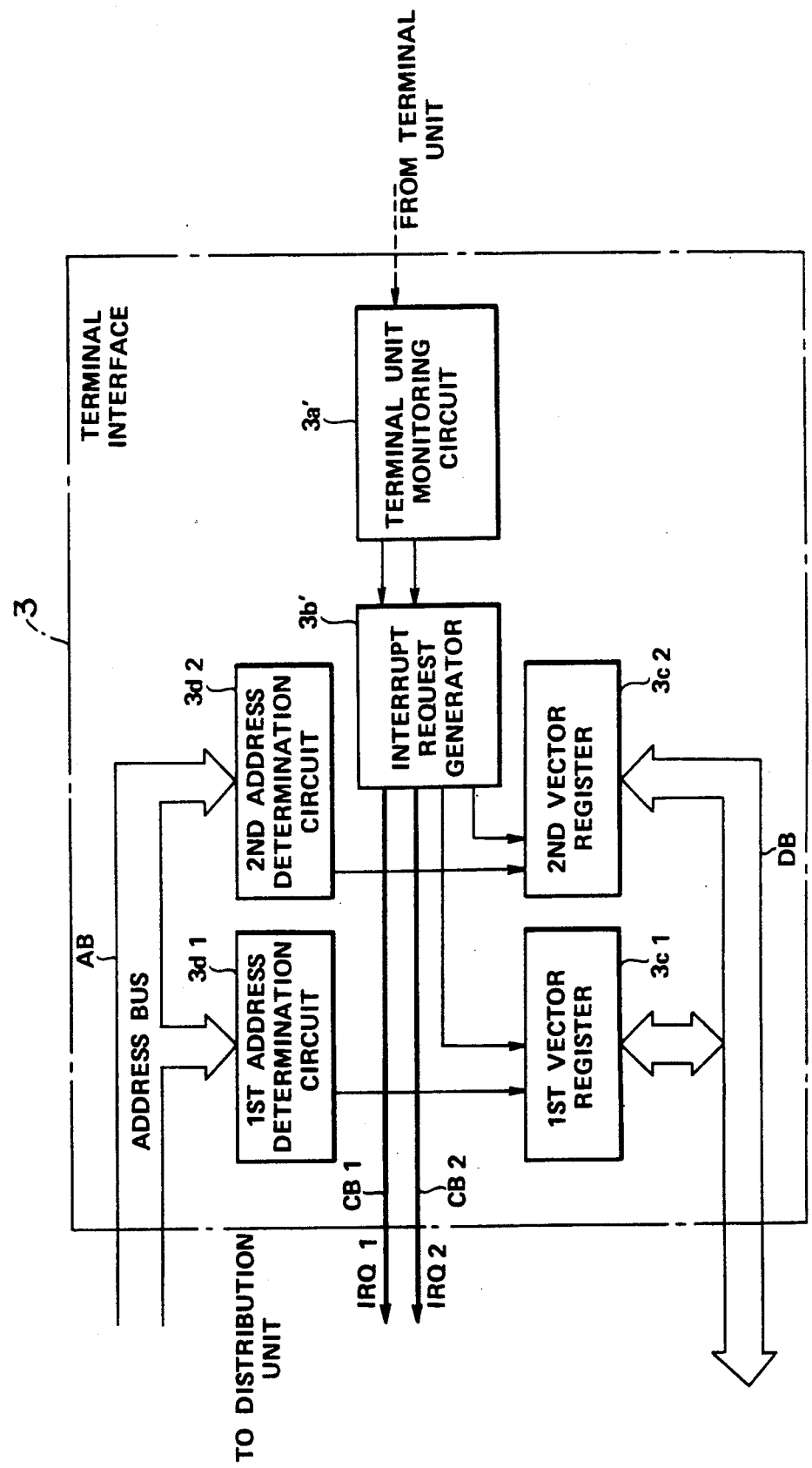
FIG. 9 is a block diagram of a terminal interface provided in conjunction with the control unit of FIG. 7 and the distribution unit of FIG. 8.

FIGS. 7–9 illustrate the specific structural elements; i.e., the control unit 100, distribution units 6 and terminal interfaces 3, of a third embodiment which embodies such a polling system. A multiplexer to which the third embodiment is applied is the same in structure as that shown in FIG. 1 except for the control unit 100, distribution units 6 and terminal interfaces 3. The elements which are the same as or corresponding to those in FIGS. 2–4 are given the same or corresponding reference characters and further duplicate description thereof will be omitted.

In the control unit, as shown in FIGS. 7–9, first and second control buses CB1 and CB2 are provided as the control bus means CB. The respective distribution units 6 (FIG. 8) each include first and second vector registers 6b1 and 6b2 as the vector register means 6b, and first and second address determination circuits 6c1 and 6c2 as the address determination circuit means 6c. Each terminal interface 3 (FIG. 9) includes first and second vector registers 3c1 and 3c2 as the vector register means 3c, and first and second address determination circuits 3d1 and 3d2 as the address determination circuit 3d.

The first control bus CB1, the first vector register 3c1 and first address determination circuit 3d1 of the terminal interface 3, and the first vector register 6b1 and first address determination circuit 6c1 of the distribution unit 6 are provided for handling an interrupt request and vector data each having a higher degree of priority while the other second control bus CB2, the second vector register 3c2 and second address determination circuit 3d2 of the terminal interface 3, and the second vector register 6b2 and second address determination circuit 6c2 of the distribution unit 6 are provided for handling an interrupt request and vector data each having a lower degree of priority.

The interrupt request generator 3b' disposed in each terminal interface outputs an interrupt request IRQ 1 through the first control bus CB1 if it is indicated that the interrupt condition has a higher degree of priority in the use of the system by the results of the detection of the interrupt condition from the corresponding terminal unit monitoring circuit 3a', and sets the vector data in the corresponding first vector register 3c1. Also, in the distribution unit which controls this terminal interface, the interrupt request detection and generation circuit 6a' similarly outputs an interrupt request IRQ 1 to the control unit 100 through the first control bus CB1 when the interrupt request IRQ 1 is detected through the first control bus CB1, and sets the transmitted vector data in the first vector register 6b1. To the contrary, the other or second control bus CB2, second vector register 3c2 and second vector register 6b2 are used for an interrupt condition having a lower degree of priority.

In order to support such use of vector registers of the terminal interfaces 3 and distribution units 6 in the first and second routes, the control unit uses data, of a total of, for example, 13 bits as the address data; i.e., a head bit which has logical contents indicating the first or second route (for example, the logical value "0" indicates the first route while the logical value "1" indicates the second route) accompanied by 12-bit address data such as that shown in the aforementioned Table.

Namely, the control unit 100 (FIG. 7) of the multiplexer designates one of the first and second routes using the head bit of the 13-bit address data (as will be described later, the first route is selected preferentially in such designation), locates the terminal interface group (the distribution unit) in which the generated source of the interrupt request is contained, by the polling operation using the 4 upper bits of the address data except for the head bit, and finally locates the terminal interface which is the source of interrupt request of concern by the polling operation using the remaining 8 lower address data bits.

When the first route is designated by the head bit of the 13-bit address data in the polling operation of the control unit 100, the first address determination circuit 6c1 (distribution unit 6 in FIG. 8) and first address determination circuits 3d1 (terminal interface 3 in FIG. 9) detect that fact. If the distribution unit or terminal interface to which the address determination circuits 6c1 or 3d1 belongs, respectively, is designated, the address determination circuits 6c1 and 3d1 instruct the corresponding first vector registers 6b1 (distribution units) or 3c1 (terminal interface) to read and output the results. When the second route is designated by the head bit of the 13-bit address data, the second address determination circuits 6c2 (distribution unit) and 3d2 (terminal interface) detect this fact, and, when their distribution unit or terminal interface is designated, the determination circuits 6c2 and 3d2 instruct the corresponding second vector registers 6b2 (distribution unit) or 3c2 (terminal interface) to read themselves and output the results.

The control operation of the internal controller 111 of the control unit 100 (FIG. 7) will be mainly described in more detail in such polling operation. On condition that the internal controller 111 has received a polling permission status signal ST from CPU 101 and either one of interrupt requests IRQ 1 and IRQ 2 through the corresponding one of the control buses CB1 and CB2, it starts to actuate an address counter 112 having a counting capacity of 13 bits.

In this starting operation, the internal controller 111 more preferentially monitors the first control bus CB1, onto which an interrupt request corresponding to a factor of interrupt having a higher degree of priority is output, than the second control bus CB2. When an interrupt request occurs only in the control bus CB1, as well as when interrupt requests occur both in the control buses CB1 and CB2, the controller 111 preferentially takes in an interrupt request IRQ 1 delivered via the first control bus CB1. When the internal controller 111 has taken in that interrupt request IRQ 1, it designates the first route for the address counter 112 by a preferential counting command C0 such that the head address bit of the address counter 112 output is, for example, a logical value "0", and then gives a first counting command C1 to the address counter 112 to cause the counter to perform a binary counting operation on the 4 upper binary bits of the address data except for the head bit.

Thus the polling operation for the distribution unit 6 (terminal interface group) is performed in the first route designated by the head bit of the address data. Each distribution unit determines whether the address data sequentially transmitted to the address bus AB designates that distribution unit, using its first address determination circuit 6c1, and, if so, outputs the contents of its first vector register 6b1 sequentially to the data bus DB. Thus the sequentially output register contents are input to the vector determination circuit 105 of the control unit 100, so that the terminal interface group to which the generated source of interrupt request IRQ belongs is located in accordance with the result of the determination of the vector data from the vector determination circuit 105, which is similar to the operation of the devices shown in FIGS. 2-4. The 13-bit address data indicative of the physical address of the located terminal interface group (distribution unit 6) and the data of the current designated route (here, the first route) are temporarily stored in the address register 104'.

When the location of the terminal interface group is completed, the internal controller 111 then gives a second counting command C2 to the address counter 112 to cause the counter to start to perform a binary counting operation on the 8 lower bits of the 13-address data. In this counting, data of 5 upper bits, inclusive of the head bit, of the address data set in the address register 104' is fixedly used.

Thus, the polling operation on the respective terminal interfaces belonging to the located terminal interface group is carried out through the first route designated by the head bit. Each terminal interface determines whether the address data sequentially transmitted to the address bus AB designates that terminal interface, using its corresponding first address determination circuit 3d1, and, if so, sequentially outputs the contents of the first vector register 3c1 thereof to the data bus DB. Thus the sequentially output contents of that register are input to the vector determination circuit 105 of the control unit 100, and the terminal interface which has output the interrupt request IRQ 1 is located in accordance with the determination of the vector data by the vector determination circuit 105, which is similar to the operations of the devices shown in FIGS. 2-4. The 13-bit address data indicative of the physical address of the located terminal interface and the designated route (here, the first route) is newly set in the address register 104', and the vector data corresponding to the interrupt condition in that terminal interface is set in the vector register 106.

If there occurs an interrupt request (IRQ 2) in the second control bus CB2 only, the internal controller 111 takes in the interrupt request IRQ 2, and designates the second route for the address counter 112 using the priority counting command C0 to cause the head bit of the address counter output to be a logical value, for example, of "1". The location of the terminal interface group to which the generated source of interrupt request IRQ 2 belongs by the polling operation on the distribution unit 6 (terminal interface group) in accordance with the first counting command C1, and the subsequent location of the terminal interface which has output the interrupt request IRQ 2 by the polling operation on the terminal interfaces belonging to the located terminal interface group in accordance with the second counting command C2 are similar to the operations mentioned above. In this case, the respective polling operations are performed through the second route designated by the head bit of the address data. As a result, the 13-bit address data indicative of the physical address of the located terminal interface and the designated route (second route) are set in the address register 104' and the vector data corresponding to the interrupt condition in that terminal interface is set in the vector register 106.

In either one of these cases, in accordance with a particular completion-indicating report (an interrupt request IRQ') through the interrupt request generator 107 by the internal controller 111, CPU 101 accesses and reads the vector register 106 using a signal AC 1, accesses and reads the address register 104' using a signal AC 2 to thereby perform a predetermined interrupt request processing operation concerning the located terminal interface, which is similar to the operations performed by the devices mentioned above.

As mentioned above, the apparatus shown in FIGS. 7-9 also serve to greatly reduce the polling time, of course, as does the apparatus shown in FIGS. 2-4, and preferentially locates the terminal interface which has generated the interrupt request corresponding to the interrupt condition having the highest degree of priority among a plurality of terminal interfaces which have output interrupt requests simultaneously.

While in the above embodiment the control bus, vector registers and address determination circuits provided in the distribution units 6 and the terminal interfaces 3 are described as being provided in two routes for convenience of explanation, these elements may be provided in three or more routes at which the corresponding finer different extents of priority are set to which such polling method may also be applicable, of course.

While in the respective embodiments the polling method and apparatus according to the present invention have been described as being applied to the multimedium multiplexer as an example, they may be similarly applicable to all devices which locate an interrupt request generated from a plurality of terminal interfaces.

What is claimed is:

1. A method for polling a plurality of distribution units and terminal interface units to determine which terminal interface unit has generated an interrupt request to a control means and to determine an interrupt condition thereof, wherein each of the plurality of terminal interface units generates the interrupt request as vector data directly corresponding to each interrupt condition, and wherein the control means determines which terminal interface unit has generated the interrupt request and the interrupt condition thereof, comprising the steps of:

sequentially addressing the plurality of distribution units from the control means to the distribution units to detect whether the vector data is generated in a terminal interface unit belonging to each distribution unit;

storing the address of an interrupt distribution unit to which the terminal interface unit which has generated the vector data belongs, the address of the interrupt distribution unit being determined on the basis of the address designated at the time when the vector data is detected;

coupling the control means to a plurality of terminal interface units belonging to the interrupt distribution unit;

sequentially addressing the terminal interface units from the control means to the terminal interface units belonging to the interrupt distribution unit by the control means to detect an interrupt terminal interface unit in which the vector data is generated among the plurality of terminal interface units belonging to the interrupt distribution unit; and storing the address of an interrupt terminal interface unit which has generated the vector data, the address of the interrupt terminal interface unit being determined on the basis of the address designated at the time when the vector data is detected.

2. A polling method according to claim 1, wherein the vector data includes data indicating an interrupt priority, and wherein the control means addresses the plurality of terminal interface units by referring to the interrupt priority data to preferentially store the address of the distribution unit to which the terminal which has generated an interrupt request having a higher degree of priority belongs.

3. A polling method according to claim 2, wherein the interrupt priority data includes number data segments ranked in accordance with the contents of the vector data, and wherein the control mean addresses the plurality of distribution units in a cyclic manner and stores the number data segment having the highest degree of priority, and preferentially stores the address of the distribution unit to which the terminal interface unit which corresponds to the stored number data segment.

4. A polling method according to claim 2, wherein the interrupt priority data represents a transmission path selected in accordance with the level of priority of the vector data transmitted to the control means, and wherein the control means addresses the interrupt distribution unit through a transmission path corresponding to the interrupt priority data.

5. A polling apparatus comprising:

a plurality of groups of terminal interface means, each terminal interface means being connected to a first bus line for control, a second bus line for data transmission, and a third bus line for address designation, each terminal interface means including means for monitoring a corresponding terminal unit such that when a interrupt condition occurs at the terminal unit, the corresponding terminal interface means outputs an interrupt request through the first bus line and stores interrupt vector data directly corresponding to that interrupt condition in a first vector register connected to the second bus line, and means for outputting the contents of the first vector register through the second bus line when the address of that terminal interface is designated through the third bus line;

a plurality of distribution unit means, each connected to a group of terminal interface means through the first, second, and third bus lines, for reading the interrupt vector data through the corresponding second bus line, for storing the interrupt vector data in a second vector register connected to the corresponding second bus line when the interrupt request is output onto the corresponding first bus line and for outputting the contents of the second vector register through the corresponding second bus line when the address of that distribution unit means is designated through the third bus line; and control means connected by the first, second, and third bus lines to each distribution unit means and to each terminal interface means for sequentially addressing each distribution unit means through the third bus line to locate an interrupt distribution unit means in which the corresponding interrupt vector data is set by reading the contents of the second vector register output to the second bus line when each distribution unit means is addressed, and after the interrupt distribution unit is located, for sequentially addressing through the third bus line the group of terminal interface means connected to the interrupt distribution unit means to locate an interrupt terminal interface means in which the corresponding interrupt vector data is set by reading the contents of the first vector register which is output to the second bus line when each terminal interface means is addressed.

6. A polling apparatus according to claim 5, wherein the control means comprises:

a vector determination circuit connected to the second bus line for determining whether the contents output to the second bus line are interrupt vector data;

an address register for fetching the address data output to the third bus line and storing the data therein when the vector determination circuit determines that the contents output to the second bus line are interrupt vector data;

a third vector register for fetching and storing the interrupt vector data when the vector determination circuit determines that the contents output to the second bus line are interrupt vector data; and an address control means for initiating the sequential addressing of each control circuit for starting to address the distribution unit means through the third bus line in response to the interrupt request output to the first bus line, for initiating the sequential addressing of each terminal interface means connected to the interrupt distribution unit means in response to a first determination by the vector determination circuit, and for storing the address of the interrupt terminal interface means in response to a second determination by the vector determination circuit.

7. A polling apparatus according to claim 5, wherein the control means comprises:

a vector determination circuit connected to the second bus line for determining whether the contents output to the second bus line are interrupt vector data;
a first address register for fetching address data output to the third bus line and storing the address data therein when the vector determination circuit determines that the contents output to the second bus line are interrupt vector data;
a second address register connected to the first address register in a relationship that data flows from the first address register to the second address register under a predetermined condition;
a third vector register for fetching and storing the interrupt vector data when the vector determination circuit determines that the contents are interrupt vector data;
a fourth vector register connected to the third vector register in a relationship that data flows from the third vector register to the fourth vector register under a predetermined condition;
comparator means for comparing the contents of the third and fourth vector registers;
means for updating the contents of the fourth vector register with the contents of the third vector register when the contents of the third vector register have a higher degree of priority than the contents of the fourth vector register;
means for updating the contents of the second address register with the contents of the first address register; and
an address control means for initiating the sequential addressing of each distribution unit means through the third bus line in response to an interrupt request output to the first bus line, for initiating the sequential addressing of each terminal interface means connected to the interrupt distribution unit means, and for storing the address of the interrupt terminal interface means when the vector determination circuit has determined that the contents of the second vector register are interrupt vector data.

8. A polling apparatus according to claim 5, wherein the control means comprises:
a vector determination circuit connected to the second bus line for determining whether the contents output to the second bus line are interrupt vector data;
a third vector register for fetching and storing the interrupt vector data when the vector determination circuit determines that the contents are interrupt vector data;
a fourth vector register connected to the third vector register in a relationship that data flows from the third vector register to the fourth vector register under a predetermined condition;
comparator means for comparing the contents of the third and fourth vector registers to output a detection signal when the contents of the third vector register have a higher degree of priority than the contents of the fourth vector register, and for updating the contents of the fourth vector register with the contents of the third vector register at that time;
an address register for fetching and storing the address data output to the third bus line when the comparator outputs the detection signal; and
an address control means for initiating the sequential addressing of each distribution unit means through the third bus line in response to an interrupt request output to the first bus line, for initiating the sequential addressing of each terminal interface means connected to the interrupt distribution unit means, and for storing the address of the interrupt terminal interface means when the vector determination circuit determines that the contents of the second vector register are interrupt vector data.

9. A polling apparatus according to claim 5, wherein the first bus line includes a plurality of the first bus lines provided in accordance with the degrees of priority of the interrupt conditions;
each terminal interface means and each distribution unit means include a plurality of first vector registers and a plurality of second vector registers corresponding to the number of first bus lines provided, the first bus lines and first and second vector registers being selectively used in accordance with the degrees of priority of the interrupt conditions; and
the control means comprises:
a vector determination circuit connected to the second bus line for determining whether the contents output to the second bus line are interrupt vector data;
an address register for fetching the address data output to the third bus line and storing the address data therein when the vector determination circuit determines that the content are interrupt vector data;
a third vector register for fetching and storing the vector data when the vector determination circuit determines that the contents are interrupt vector data; and
an address control means for initiating the sequential addressing each control circuit for starting to address through the third bus line distribution unit means associated with one of the plurality of the first bus lines having a higher interrupt priority, for initiating the sequential addressing of each terminal interface means connected to the interrupt distribution unit means through the third bus line in response to a first determination by the vector determination circuit, and for storing the address of the interrupt terminal interface means in accordance with a second determination by the vector determining circuit.

10. A polling method according to claim 1, wherein said coupling step includes the substep of generating a plurality of addresses by the control unit corresponding to every one of the plurality of terminals belonging to the interrupt distribution unit.

* * * * *

UNITED STATES PATENT AND TRADEMARK OFFICE
CERTIFICATE OF CORRECTION

Page 1 of 2

PATENT NO. : 5,101,199
DATED : March 31, 1992
INVENTOR(S) : Muneyuki Suzuki

It is certified that error appears in the above-indentified patent and that said Letters Patent is hereby corrected as shown below:

On the Title page, item [54] Title, and column 1, line 3, change "POLLING METHOD AND APPARATUS" to -- POLLING METHOD UTILIZING TERMINAL INTERFACES THAT GENERATE VECTOR DATA AND ARE ARRANGED IN GROUPS--.

Claim 3, column 15, line 46, change "mean" to --means--.

Claim 5, column 15, line 66, change "a" to --an--.

Claim 5, column 16, line 16, change "line" to --line,--.

Claim 6, column 16, line 54, delete "control circuit for starting to".

Claim 6, column 16, line 55, delete "address the".

UNITED STATES PATENT AND TRADEMARK OFFICE
CERTIFICATE OF CORRECTION

PATENT NO. : 5,101,199
DATED : March 31, 1992
INVENTOR(S) : Muneyuki Suzuki

It is certified that error appears in the above-identified patent and that said Letters Patent is hereby corrected as shown below:

Claim 9, column 18, line 36, change "content" to --contents--.

Claim 9, column 18, line 43, change "line" to --line,--.

Claim 9, column 18, line 52 and 53, change "determining" --determination--.

Signed and Sealed this

First Day of February, 1994

Attest:

BRUCE LEHMAN

Attesting Officer

Commissioner of Patents and Trademarks